(12) United States Patent
Hart (10) Patent No.: US 8,619,022 B1
(45) Date of Patent: Dec. 31, 2013

(54) UPDATING A TASK-MANAGEMENT SYSTEM BY MANIPULATING PHYSICAL OBJECTS

(75) Inventor: Matt Eric Hart, Lunenburg, MA (US)

(73) Assignee: Intuit Inc., Mountain View, CA (US)

( * ) Notice: Subject to any disclaimer, the term of this patent is extended or adjusted under 35 U.S.C. 154(b) by 839 days.

(21) Appl. No.: 12/568,111

(22) Filed: Sep. 28, 2009

(51) Int. Cl.
*G09G 5/00* (2006.01)

(52) U.S. Cl.
USPC ............................ 345/156; 345/157; 345/474

(58) Field of Classification Search
USPC ................. 345/156, 473, 734, 474; 707/636; 705/1, 15, 14.53, 0.66, 206; 455/411
See application file for complete search history.

(56) References Cited

U.S. PATENT DOCUMENTS

| | | | | |
|---|---|---|---|---|
| 7,054,878 B2 * | 5/2006 | Gottsman et al. | ............. | 707/636 |
| 8,165,916 B2 * | 4/2012 | Hoffberg et al. | ........... | 705/14.53 |
| 2004/0030572 A1 * | 2/2004 | Campbell et al. | ................. | 705/1 |
| 2004/0169677 A1 * | 9/2004 | Utsuki et al. | ................... | 345/734 |
| 2005/0221798 A1 * | 10/2005 | Sengupta et al. | .............. | 455/411 |
| 2005/0251450 A1 * | 11/2005 | Koether et al. | ................. | 705/15 |
| 2006/0010078 A1 * | 1/2006 | Rezvani et al. | ................. | 705/66 |
| 2007/0136360 A1 * | 6/2007 | Randall et al. | ................ | 707/636 |
| 2010/0161431 A1 * | 6/2010 | Koether et al. | ................. | 705/15 |
| 2011/0119339 A1 * | 5/2011 | Williams et al. | .............. | 709/206 |
| 2012/0105458 A1 * | 5/2012 | Audet | ........................... | 345/473 |

\* cited by examiner

*Primary Examiner* — Thuy Pardo (74) *Attorney, Agent, or Firm* — Park, Vaughan, Fleming & Dowler LLP (57) ABSTRACT

One embodiment of the present invention provides a system that facilitates updating a task-management system by manipulating physical objects. During operation, the system receives a notification at a computer system indicating that a physical icon (phycon) has been moved to a first physical location, wherein a phycon is a physical object that is associated with an element or an attribute of a task-management system. Next, the system identifies an element of the task-management system that is associated with the phycon. The system then identifies an attribute of the task-management system that is associated with the first physical location. Finally, the system applies the attribute to the element in the task-management system.

29 Claims, 5 Drawing Sheets

UPDATING A TASK-MANAGEMENT SYSTEM BY MANIPULATING PHYSICAL OBJECTS

BACKGROUND

Related Art

Project management systems typically provide mechanisms for regularly reporting accomplished tasks, as well as reporting the status of tasks that are not yet complete. Often, individuals neglect to report their progress on tasks and jobs until the task or job is complete. Furthermore, individuals tend to report less often when they are facing impending deadlines or when they are feeling pressured for time.

Some of the neglect of reporting duties can be traced to the reporting mechanisms of the various task-management systems. For example, many existing systems have complicated user interfaces that require the individual to authenticate to the system, navigate to a desired project and task, and input information regarding the status of the task. This process can be time consuming, and thus, can result in individuals putting off status reporting or skipping it entirely.

SUMMARY

One embodiment of the present invention provides a system that facilitates updating a task-management system by manipulating physical objects. During operation, the system receives a notification at a computer system indicating that a physical icon (phycon) has been moved to a first physical location, wherein a phycon is a physical object that is associated with an element or an attribute of a task-management system. Next, the system identifies an element of the task-management system that is associated with the phycon. The system then identifies an attribute of the task-management system that is associated with the first physical location. Finally, the system applies the attribute to the element in the task-management system.

In some embodiments of the present invention, the system identifies the element of the task-management system that is associated with the phycon by: determining an identifier associated with the phycon; and performing a lookup operation using the identifier in the task-management system to identify the element that is associated with the phycon.

In some embodiments of the present invention, the system identifies the attribute of the task-management system that is associated with the first physical location by performing a lookup using the first physical location in the task-management system to identify the attribute that is associated with the first physical location.

In some embodiments of the present invention, the system receives a second notification at a computer system indicating that the phycon has been moved in close proximity to a second phycon. Next, the system identifies a second attribute of the task-management system that is associated with the second phycon. Finally, the system applies the second attribute to the element in the task-management system.

In some embodiments of the present invention, the system receives a second notification at a computer system indicating that a second phycon has been moved in close proximity to the phycon. Next, the system identifies a second attribute of the task-management system that is associated with the second phycon. Finally, the system applies the second attribute to the element in the task-management system.

In some embodiments of the present invention, the system receives a second notification at the computer system indicating that a second phycon has been moved to the first physical location. Next, the system identifies a second attribute of the task-management system that is associated with the second phycon. Finally, the system applies the second attribute to the element in the task-management system.

In some embodiments of the present invention, the computer system incorporates at least one camera. The computer system subsequently identifies the phycon and the movement of the phycon via an optical recognition process.

In some embodiments of the present invention, the phycon incorporates a radio-frequency identification (RFID) tag, and the computer system incorporates at least one RFID reader.

In some embodiments of the present invention, elements of the task-management system include at least one of: tasks, jobs, events, and roles.

In some embodiments of the present invention, attributes of the task-management system include at least one of: percent complete, completion status, current status, accrued time, estimated completion time, exception information, and assigned owner.

In some embodiments of the present invention, the task-management system is a SCRUM-based development system. Note that SCRUM is an agile process for software development. With SCRUM, projects progress via a series of iterations called sprints. Each sprint is typically 2-4 weeks long. Scrum is ideally suited for projects with rapidly changing or highly emergent requirements, and requires constant reporting of status.

In some embodiments of the present invention, the system receives the identifier associated with the phycon from a user at the task-management system. Next, the system receives a selection of the element from the user at the task-management system. Finally, the system associates the element with the identifier within the task-management system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates updating a task-management system by manipulating physical objects. During operation, the system receives a notification at a computer system indicating that a physical icon (phycon) has been moved to a first physical location, wherein a phycon is a physical object that is associated with at least one of an element and an attribute of a task-management system.

For example, a phycon could be a chess piece, a Matchbox® car, a paper tag, a piece of LEGO®, a rock, or any other physical object that can be manipulated by the user. Note that a phycon that has a physical likeness to a specific task or job might help the user to visualize the status of an entire project. For example, if the user sees a bunch of toy cars which represent the shipment of goods in an incomplete pile, the user can quickly determine that the project may be suffering from some logistics problems.

Next, the system identifies an element of the task-management system that is associated with the phycon. The system then identifies an attribute of the task-management system that is associated with the first physical location. Finally, the system applies the attribute to the element in the task-management system.

For example, if the user moves a wooden block representing a construction task from a pile of other phycons and places the wooden block in a complete pile, the system would update the construction task in the task-management system to indicate that the construction task has been completed.

In some embodiments of the present invention, the system identifies the element of the task-management system that is associated with the phycon by: determining an identifier associated with the phycon; and performing a lookup using the identifier in the task-management system to identify the element that is associated with the phycon. Note that performing the lookup can include querying a database with the phycon's identifier. This database can be a stand-alone database, or it can be integrated within the task-management system.

In some embodiments of the present invention, the system identifies the attribute of the task-management system that is associated with the first physical location by performing a lookup operation using the first physical location in the task-management system to identify the attribute that is associated with the first physical location. Note that the physical location can be indicated by various techniques. For example, in one embodiment the physical location can be represented as a distance from an RFID reader, while in another embodiment location can be represented as Global Positioning System (GPS) coordinates.

In some embodiments of the present invention, the system receives a second notification at a computer system indicating that the phycon has been moved in close proximity to a second phycon. Next, the system identifies a second attribute of the task-management system that is associated with the second phycon. Finally, the system applies the second attribute to the element in the task-management system.

For example, if the user moved a cylindrical phycon representing a database task next to a complete pie phycon representing a "complete" status, the system would then mark the database task as complete.

In some embodiments of the present invention, the system receives a second notification at a computer system indicating that a second phycon has been moved in close proximity to the phycon. Next, the system identifies a second attribute of the task-management system that is associated with the second phycon. Finally, the system applies the second attribute to the element in the task-management system.

For example, a user may move a pie-chart phycon that is half full representing a half complete status next to a truck phycon representing a shipment of goods. In response to this action, the task-management system would then update the shipment of goods job to indicate that it is 50% complete. Note that it does not matter which phycons are moved next to which other phycons, only that two or more phycons are moved into close proximity or are moved to a specific location.

Also note that many phycons associated with different elements can be placed in close proximity to a single phycon associated with an attribute, and the task-management system will apply the attribute to all of the elements. Furthermore, a phycon representing an element can be placed in close proximity to multiple phycons representing multiple attributes and the task-management system can apply the multiple attributes to the single element. Hence, any combination of attributes and elements may be combined, which enables the user to make many updates and perform mass updates in a very short period of time.

In some embodiments of the present invention, the system receives a second notification at the computer system indicating that a second phycon has been moved to the first physical location. Next, the system identifies a second attribute of the task-management system that is associated with the second phycon. Finally, the system applies the second attribute to the element in the task-management system.

Note that in these embodiments, the sequence of the phycon movements is important. When using the sequence method, a single lookup associated with the first phycon initiating the sequence takes place. If the first lookup results with an element, then all of the following attributes are applied to the element. However, if the first lookup results in an attribute, then all of the following elements are given the attribute.

For example, if the first phycon is associated with a database programming task, the second phycon with the attribute "assigned to Matt," and the third phycon associated with the attribute "50% complete," then the system updates the database programming task to reflect that it is assigned to Matt and that it is 50% complete. Likewise, if the first phycon is associated with the attribute "50% complete," the second phycon with the element "database programming task," and the third phycon with the element "user interface case study," then the system updates the database programming task and the user interface case study to indicate that they are both 50% complete.

In some embodiments of the present invention, the computer system incorporates at least one camera. The computer system subsequently identifies the phycon and the movement of the phycon via an optical recognition process.

In some embodiments of the present invention, the phycon incorporates a radio-frequency identification (RFID) tag, and the computer system incorporates at least one RFID reader. Note that while the RFID tag and reader are described herein, any technique for identifying phycons and their corresponding locations may be used.

In some embodiments of the present invention, elements of the task-management system include at least one of: tasks, jobs, events, and roles. Any element that can be tracked by the task-management system can be represented by a phycon.

In some embodiments of the present invention, attributes of the task-management system include at least one of: percent complete, completion status, current status, accrued time, estimated completion time, exception information, and assigned owner. In general, any attribute that can be tracked by the task-management system can be represented by a phycon.

In some embodiments of the present invention, the task-management system is a SCRUM-based development system. Note that SCRUM-based development systems are described for illustrative purposes, and any task-management system may be used.

In some embodiments of the present invention, the system receives the identifier associated with the phycon from a user at the task-management system. Next, the system receives a selection of the element from the user at the task-management system. Finally, the system associates the element with the identifier within the task-management system.

For example, the task-management system may include a management console wherein the user can take any phycon, assign it a unique identifier, and associate it with an element or an attribute of the task-management system.

Computing Environment

Figure 1A:
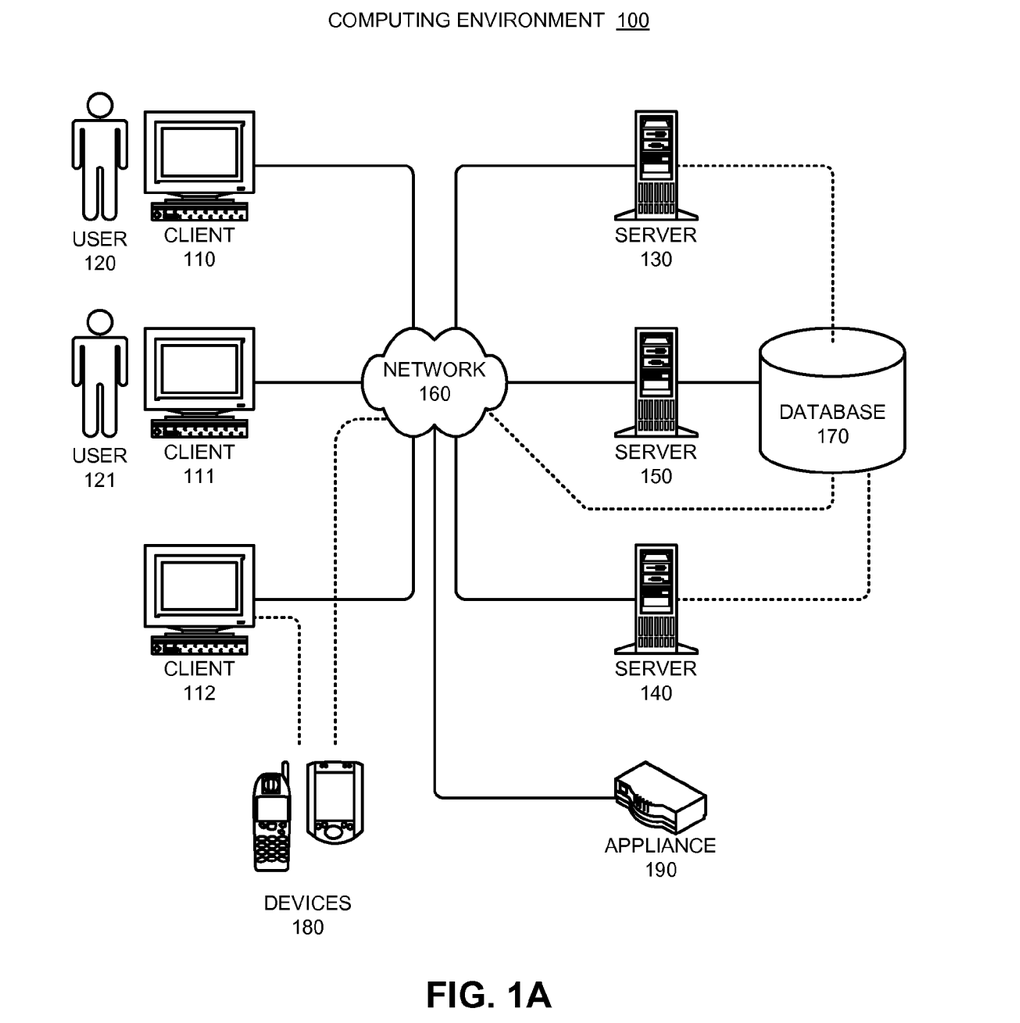
FIG. 1A illustrates a computing environment in accordance with an embodiment of the present invention.

FIG. 1A illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Note that in some embodiments of the present invention, database 170 is integrated into a task-management system, while in other embodiments, database 170 is a stand-alone database that is coupled to a task-management system.

Devices 180 can include any type of electronic device that can be coupled to a client, such as client 112, or a network, such as network 160. This includes, but is not limited to, cell phones, personal digital assistants (PDAs), smart-phones, personal music players (such as MP3 players), gaming systems, digital cameras, portable storage media, or any other device that can be coupled to the client. Note that, in some embodiments of the present invention, devices 180 can be coupled directly to network 160 and can function in the same manner as clients 110-112.

In some embodiments of the present invention, devices 180 may include physical objects, such as Radio Frequency ID (RFID) tagged devices, and devices with sensors, including accelerometers and strain gauges.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention. Also note that embodiments of the present invention may include any physical object that can be tagged with an identifier and tracked within a physical space.

Phycons

Figure 1B:
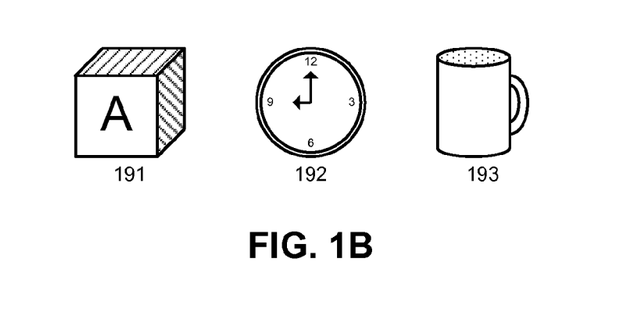
FIG. 1B illustrates phycons in accordance with an embodiment of the present invention.

FIG. 1B illustrates phycons 191-193 in accordance with an embodiment of the present invention. Note that a phycon is a physical object that is associated with at least one of an element and an attribute of a task-management system. Also note that phycons 191-193 may take on any shape or size.

In some embodiments of the present invention, it may be beneficial to user 110 to use phycons that have strong visual connections to the elements and attributes of the task-management system. For example, phycon 192 is a miniature clock pointing to 9:00 and can represent nine hours of work spent on a job, or a 9:00 start time for a task. Furthermore, phycon 193, which is a coffee cup, may represent a status of "on break" for user 120.

System

Figure 2:
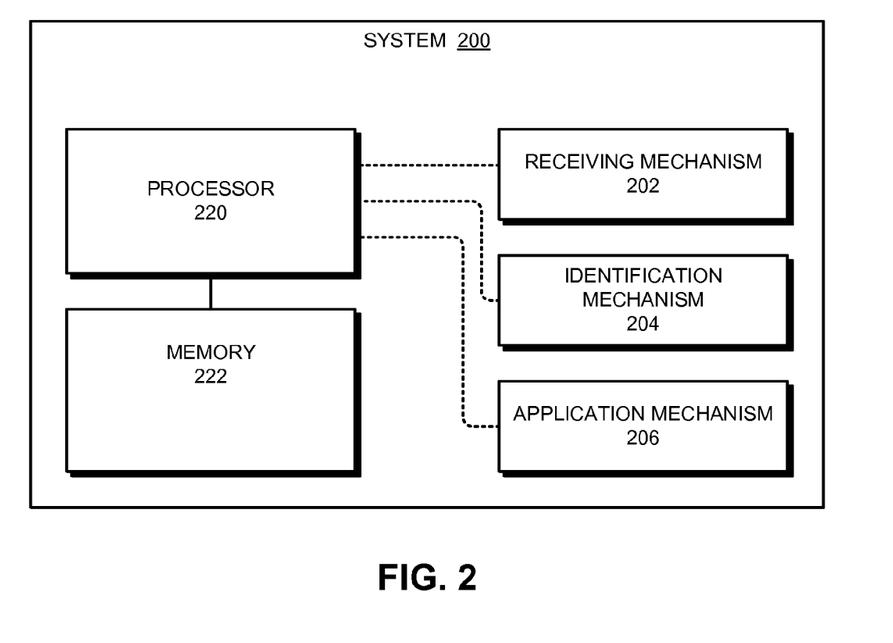
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, identification mechanism 204, application mechanism 206, processor 220, and memory 222.

Moving a Phycon to a Physical Location

Figure 3:
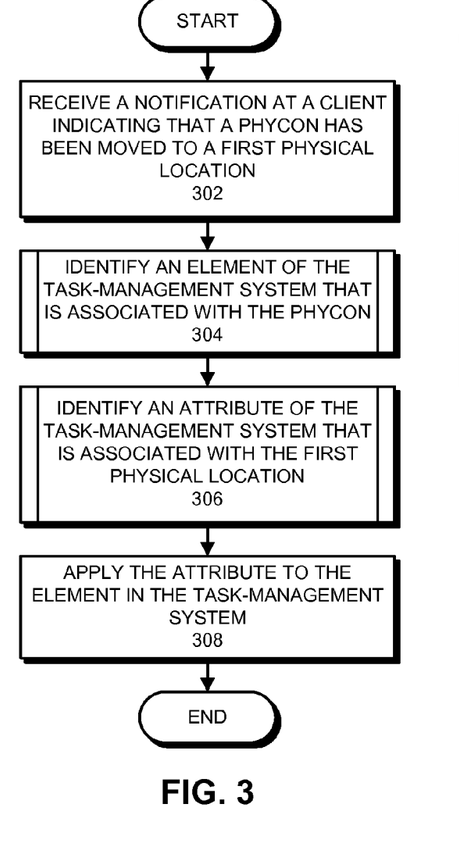
FIG. 3 presents a flow chart illustrating the process of updating a status when a phycon has been moved to a physical location in accordance with an embodiment of the present invention.

FIG. 3 presents a flow chart illustrating the process of updating a status when phycon 191 has been moved to a physical location in accordance with an embodiment of the present invention. During operation, receiving mechanism 202 receives a notification at client 110 indicating that a physical icon (phycon 191) has been moved to a first physical location (operation 302).

Next, identification mechanism 204 identifies an element of the task-management system that is associated with phycon 191 (operation 304). Identification mechanism 204 then identifies an attribute of the task-management system that is associated with the first physical location (operation 306). Finally, application mechanism 206 applies the attribute to the element in the task-management system (operation 308).

Identifier-Based Lookup

Figure 4:
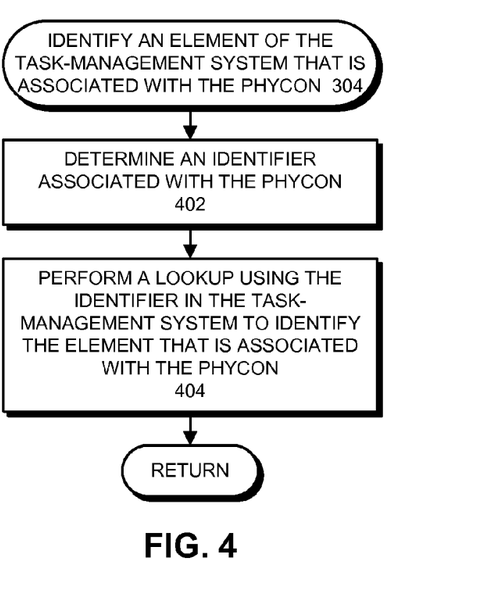
FIG. 4 presents a flow chart illustrating the process of performing a lookup of an element or an attribute using a phycon's identifier in accordance with an embodiment of the present invention.

FIG. 4 presents a flow chart illustrating the process of performing a lookup of an element or an attribute using a phycon 191's identifier in accordance with an embodiment of the present invention. First, identification mechanism 204 identifies the element of the task-management system that is associated with phycon 191 by first determining an identifier associated with phycon 191 (operation 402).

Next, identification mechanism 204 performs a lookup operation using the identifier in the task-management system to identify the element that is associated with the phycon 191 (operation 404). Note that performing the lookup can include querying a database with phycon 191's identifier. This database can be a stand-alone database, such as database 170, or it can be integrated within the task-management system.

Location-Based Lookup

Figure 5:
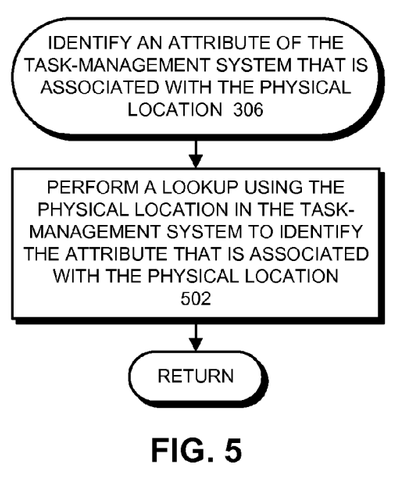
FIG. 5 presents a flow chart illustrating the process of performing a lookup of an element or an attribute using a location in accordance with an embodiment of the present invention.

FIG. 5 presents a flow chart illustrating the process of performing a lookup of an element or an attribute using a location in accordance with an embodiment of the present invention. During this process, identification mechanism 204 identifies the attribute of the task-management system that is associated with the first physical location by performing a lookup operation using the first physical location in the task-management system to identify the attribute that is associated with the first physical location (operation 502).

Note that the physical location can be indicated by various techniques. For example, in one embodiment the physical location can be represented as being in close proximity to an RFID reader that is coupled to client 110, while in another embodiment location can be represented as Global Positioning System (GPS) coordinates.

Moving a Phycon Near a Second Phycon: Moving an Element to an Attribute

Figure 6:
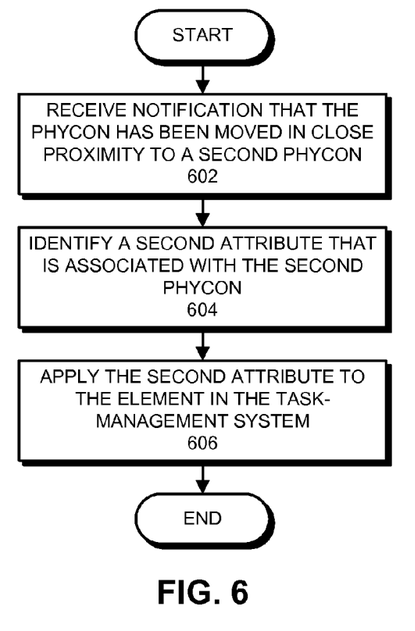
FIG. 6 presents a flow chart illustrating the process of updating a status when a phycon has been moved next to a second phycon in accordance with an embodiment of the present invention.

FIG. 6 presents a flow chart illustrating the process of updating a status when phycon 191 has been moved next to phycon 192 in accordance with an embodiment of the present invention. In some embodiments of the present invention, receiving mechanism 202 receives a second notification at client 110 indicating that phycon 191 has been moved in close proximity to a second phycon, phycon 192 (operation 602). Note that receiving mechanism 202 knows that the phycon and the second phycon are in close proximity when they are co-located within range of a single RFID reader that reports the presence of both phycons. Identification mechanism 204 then identifies a second attribute of the task-management system that is associated with phycon 192 (operation 604). Finally, application mechanism 206 applies the second attribute to the element in the task-management system (operation 606).

Moving a Second Phycon Near a Phycon: Moving an Attribute to an Element

Figure 7:
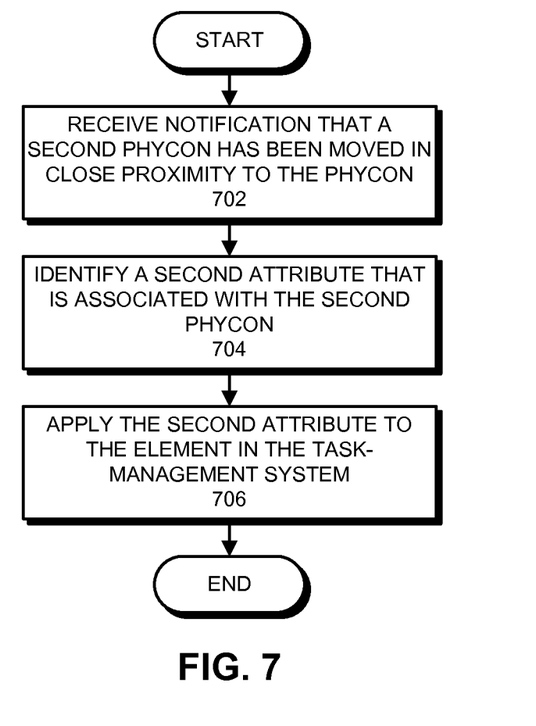
FIG. 7 presents a flow chart illustrating the process of updating a status when a second phycon has been moved next to a phycon in accordance with an embodiment of the present invention.

FIG. 7 presents a flow chart illustrating the process of updating a status when phycon 192 has been moved next to phycon 191 in accordance with an embodiment of the present invention. In some embodiments of the present invention, receiving mechanism 202 receives a second notification at client 110 indicating that a second phycon, phycon 192, has been moved in close proximity to phycon 191 (operation 702). Identification mechanism 204 then identifies a second attribute of the task-management system that is associated with phycon 192 (operation 704). Finally, application mechanism 206 applies the second attribute to the element in the task-management system (operation 706).

Note that as described previously, it does not matter which phycons are moved next to which other phycons, only that two or more phycons are moved into close proximity with each other, or that they are moved to a specific location.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for updating a task-management system by manipulating physical objects, the method comprising:
   receiving a notification at a computer system indicating that a physical icon (phycon) has been moved to a first physical location, wherein the phycon is a physical object that is associated with at least one of an element and an attribute of a task-management system, and wherein the notification comprises data for the first physical location and an image of the phycon;
   identifying, by using the image, an element of the task-management system that is associated with the phycon;
   identifying, by using the data for the first physical location, an attribute of the task-management system that is associated with the first physical location; and
   applying the attribute to the element in the task-management system.

2. The computer-implemented method of claim 1, wherein identifying the element of the task-management system that is associated with the phycon involves:
   determining an identifier associated with the phycon; and
   performing a lookup operation using the identifier in the task-management system to identify the element that is associated with the phycon.

3. The computer-implemented method of claim 1, wherein identifying the attribute of the task-management system that is associated with the first physical location involves performing a lookup operation using the first physical location in the task-management system to identify the attribute that is associated with the first physical location.

4. The computer-implemented method of claim 1, further comprising:
receiving a second notification at the computer system indicating that the phycon has been moved in close proximity to a second phycon;
identifying a second attribute of the task-management system that is associated with the second phycon; and
applying the second attribute to the element in the task-management system.

5. The computer-implemented method of claim 1, further comprising:
receiving a second notification at the computer system indicating that a second phycon has been moved in close proximity to the phycon;
identifying a second attribute of the task-management system that is associated with the second phycon; and
applying the second attribute to the element in the task-management system.

6. The computer-implemented method of claim 1, further comprising:
receiving a second notification at the computer system indicating that a second phycon has been moved to the first physical location;
identifying a second attribute of the task-management system that is associated with the second phycon; and
applying the second attribute to the element in the task-management system.

7. The computer-implemented method of claim 1, wherein the computer system incorporates at least one camera, and wherein the computer system identifies the phycon and the movement of the phycon via an optical recognition process.

8. The computer-implemented method of claim 1, wherein the phycon incorporates a radio-frequency identification (RFID) tag, and wherein the computer system incorporates at least one RFID reader.

9. The computer-implemented method of claim 1, wherein elements of the task-management system include at least one of:
tasks;
jobs;
events; and
roles.

10. The computer-implemented method of claim 1, wherein attributes of the task-management system include at least one of:
percent complete;
completion status;
current status;
accrued time;
estimated completion time;
exception information; and
assigned owner.

11. The computer-implemented method of claim 1, wherein the task-management system is a SCRUM-based development system.

12. The computer-implemented method of claim 1, further comprising:
receiving the identifier associated with the phycon from a user at the task-management system;
receiving a selection of the element from the user at the task-management system; and
associating the element with the identifier within the task-management system.

13. The computer-implemented method of claim 1, wherein the phycon does not include a device that communicates with the computer system.

14. The computer-implemented method of claim 1, further comprising:
using a camera to capture the image of the phycon and an image for the first physical location, wherein the data for the first physical location comprises the image for the first physical location,
wherein the notification comprises the image of the phycon,
wherein identifying the element of the task-management system comprises using the image of the phycon to identify the phycon, and
wherein identifying the attribute of the task-management system comprises using the image for the first physical location to identify the first physical location.

15. The computer-implemented method of claim 1, further comprising:
using a radio-frequency identification (RFID) reader to determine the identification for the phycon from a RFID tag for the phycon; and
using the RFID reader to determine the data for the first physical location, wherein the data for the first physical location identifies the first physical location,
wherein identifying the element of the task-management system comprises using the identification for the phycon.

16. A computer-readable storage medium storing instructions that when executed by a computer cause the computer to perform a method for updating a task-management system by manipulating physical objects, the method comprising:
receiving a notification at a computer system indicating that a physical icon (phycon) has been moved to a first physical location, wherein the phycon is a physical object that is associated with at least one of an element and an attribute of a task-management system, and wherein the notification comprises data for the first physical location and an image of the phycon;
identifying, by using the image, an element of the task-management system that is associated with the phycon;
identifying, by using the data for the first location, an attribute of the task-management system that is associated with the first physical location; and
applying the attribute to the element in the task-management system.

17. The computer-readable storage medium of claim 16, wherein identifying the element of the task-management system that is associated with the phycon involves:
determining an identifier associated with the phycon; and
performing a lookup operation using the identifier in the task-management system to identify the element that is associated with the phycon.

18. The computer-readable storage medium of claim 16, wherein identifying the attribute of the task-management system that is associated with the first physical location involves performing a lookup operation using the first physical location in the task-management system to identify the attribute that is associated with the first physical location.

19. The computer-readable storage medium of claim 16, wherein the method further comprises:
receiving a second notification at the computer system indicating that the phycon has been moved in close proximity to a second phycon;
identifying a second attribute of the task-management system that is associated with the second phycon; and applying the second attribute to the element in the task-management system.

20. The computer-readable storage medium of claim 16, wherein the method further comprises:
receiving a second notification at the computer system indicating that a second phycon has been moved in close proximity to the phycon;
identifying a second attribute of the task-management system that is associated with the second phycon; and
applying the second attribute to the element in the task-management system.

21. The computer-readable storage medium of claim 16, wherein the method further comprises:
receiving a second notification at the computer system indicating that a second phycon has been moved to the first physical location;
identifying a second attribute of the task-management system that is associated with the second phycon; and
applying the second attribute to the element in the task-management system.

22. The computer-readable storage medium of claim 16, wherein elements of the task-management system include at least one of:
tasks;
jobs;
events; and
roles.

23. The computer-readable storage medium of claim 16, wherein attributes of the task-management system include at least one of:
percent complete;
completion status;
current status;
accrued time;
estimated completion time;
exception information; and
assigned owner.

24. The computer-readable storage medium of claim 16, wherein the method further comprises:
receiving the identifier associated with the phycon from a user at the task-management system;
receiving a selection of the element from the user at the task-management system; and
associating the element with the identifier within the task-management system.

25. An apparatus configured to update a task-management system by manipulating physical objects, comprising:
a processor;
a memory;
a receiving mechanism configured to receive a notification at a computer system indicating that a physical icon (phycon) has been moved to a first physical location, wherein a phycon is a physical object that is associated with at least one of an element and an attribute of a task-management system, and wherein the notification comprises data for the first physical location and an image of the phycon;
an identification mechanism configured to identify, by using the image, an element of the task-management system that is associated with the phycon;
wherein the identification mechanism is further configured to identify, by using the data for the first physical location, an attribute of the task-management system that is associated with the first physical location; and
an application mechanism configured to apply the attribute to the element in the task-management system.

26. The apparatus of claim 25, wherein the identification mechanism is configured to identify the element of the task-management system that is associated with the phycon by:
determining an identifier associated with the phycon; and
performing a lookup operation using the identifier in the task-management system to identify the element that is associated with the phycon.

27. The apparatus of claim 25, wherein the identification mechanism is configured to identify the attribute of the task-management system that is associated with the first physical location by performing a lookup operation using the first physical location in the task-management system to identify the attribute that is associated with the first physical location.

28. The apparatus of claim 25:
wherein the receiving mechanism is further configured to receive a second notification at the computer system indicating that the phycon has been moved in close proximity to a second phycon;
wherein the identification mechanism is further configured to identify a second attribute of the task-management system that is associated with the second phycon; and
wherein the application mechanism is further configured to apply the second attribute to the element in the task-management system.

29. The apparatus of claim 25:
wherein the receiving mechanism is further configured to receive a second notification at the computer system indicating that a second phycon has been moved in close proximity to the phycon;
wherein the identification mechanism is further configured to identify a second attribute of the task-management system that is associated with the second phycon; and
wherein the application mechanism is further configured to apply the second attribute to the element in the task-management system.

* * * * *